United States Patent

Ishiwata et al.

[11] Patent Number: 5,736,264
[45] Date of Patent: Apr. 7, 1998

[54] MAGNETIC CORE AND MAGNETIC HEAD USING THE SAME

[75] Inventors: Nobuyuki Ishiwata; Yoshio Takeshima; Takahiro Korenari; Haruo Urai, all of Tokyo, Japan

[73] Assignee: NEC Corporation, Tokyo, Japan

[21] Appl. No.: 35,411

[22] Filed: Mar. 23, 1993

[30] Foreign Application Priority Data

Apr. 15, 1992 [JP] Japan .................. 4-094675

[51] Int. Cl.$^6$ .................................. G11B 5/66
[52] U.S. Cl. .................. 428/694 R; 428/694 T; 428/900; 360/110; 360/120; 360/126
[58] Field of Search .............. 428/694 R, 694 T, 428/900; 360/110, 126, 120

[56] References Cited

U.S. PATENT DOCUMENTS

| | | | |
|---|---|---|---|
| 4,887,177 | 12/1989 | Sillen | 360/120 |
| 4,953,051 | 8/1990 | Wada | 360/126 |
| 5,084,795 | 1/1992 | Sakakima | 360/120 |
| 5,227,940 | 7/1993 | Isomura | 360/126 |
| 5,262,915 | 11/1993 | Terunuma | 360/120 |
| 5,276,574 | 1/1994 | Abe | 360/126 |

FOREIGN PATENT DOCUMENTS 3-219407  9/1991  Japan .

OTHER PUBLICATIONS

"The 1991 Spring Conference SC–5–5", The Electronics, Information and Communication Engineers, pp. 5–285.
"The 15th Science Lecture Meeting of the Japan Applied Magnetic Physical Society", Oct., 1991, pp. 11.

*Primary Examiner*—Leszek Kiliman
*Attorney, Agent, or Firm*—Sughrue, Mion, Zinn, Macpeak & Seas, PLLC

[57] ABSTRACT

A magnetic head of the present invention has a magnetic core and a substrate for supporting the magnetic core. The magnetic core has a magnetic layer which is of a soft magnetic alloy mainly composed of FeTaN. The composition of the alloy meets $72 \leq x \leq 82$, $5 \leq y \leq 15$, $10 \leq z \leq 15$ by atomic percent, where the alloy is indicated to be $Fe_xM_yN_z$. The magnetic layer contains crystal grains of body-centered cubic structure, and each diameter of said crystal grains is less than 10 nm. The crystal grains have lattice planes which are orientated at random.

5 Claims, 13 Drawing Sheets

X-ray DIFFRACTION PATTERN

- 213 FeTaN LAYERED CORE
- 214 HEAD GAP
- 211 WINDING WINDOW
- 216 COIL
- 212b FERRITE SUBSTRATE
- 212a FERRITE SUBSTRATE

FIG. 13

- 314 HEAD GAP
- 315
- 313
- 311 WINDING WINDOW
- 315
- 312 FERRITE SUBSTRATE
- 313 FeTaN LAYERED CORE
- 312 FERRITE SUBSTRATE
- 315 BONDING GLASS

- 521 UPPER MAGNETIC LAYER
- 524 INSURATING LAYER
- 523 HEAD GAP
- 525 COIL
- 522 LOWER MAGNETIC LAYER
- 526 SUBSTRATE

FIG. 15B

- 525 COIL
- 521 UPPER MAGNETIC LAYER 5,736,264

MAGNETIC CORE AND MAGNETIC HEAD USING THE SAME

FIELD OF THE INVENTION

This invention relates to a magnetic core for a magnetic head, and more particularly, to a magnetic core for a magnetic head for high density recording and reproducing of information.

BACKGROUND OF THE INVENTION

A magnetic head includes a magnetic core, and two reinforcing substrates for supporting the magnetic core between them. In such a magnetic head, it is required that a recording medium has a high coercive force and a magnetic head has a high saturation magnetization in order to perform high density magnetic recording of information.

Soft magnetic metal such as sendust, amorphous or the like has been proposed and studied to be used as material for a magnetic core, which has a high saturation magnetization as compared to ferrite etc.

A conventional magnetic head of layered type, in which a magnetic core is fabricated by using FeMN sputtering layers, where "M" is at least one element selected from Ta, Zr, Nb, Hf and Ti, is described on page 11 in the summaries for "The 15th Science Lecture Meeting of the Japan Applied Magnetic Physical Society" published in October of 1991. An MIG (metal in gap) head is described in a proceedings of "The 1991 spring conference SC-5-5" given by "The Electronics, Information and Communication Engineers".

It is known that a FeMN sputtering layer has a fine crystal structure obtained by a thermal treatment as shown in a Japanese patent Kokai number "Heisei 3-219407". Such a FeMN sputtering layer having a fine crystal structure is preferable in soft magnetic characteristics.

According to the above mentioned conventional magnetic heads, however, there is a disadvantage in that a soft magnetic property of the magnetic core is dispered, because the fine crystal structure has not been made clear to enhance the soft magnetic property. Therefore, it has been required that an efficiency and a fabrication yield of the magnetic head are improved.

SUMMARY OF THE INVENTION

Accordingly, it is an object of the invention to provide a magnetic core for a magnetic head in which the improved soft magnetic characteristics is stable to be obtained.

It is another object of the invention to provide a magnetic head which can operate at high efficiency.

According to a first feature of the invention, a magnetic core includes:

a magnetic layer which is of a soft magnetic alloy mainly composed of Fe, N and M, "M" being at least one element selected from Ta, Zr, Nb, Hf and Ti, and the composition of the alloy meeting $72 \leq x \leq 82$, $5 \leq y \leq 15$, $10 \leq z \leq 15$ and $x+y+z=100$ by atomic percent, where the alloy is indicated to be $Fe_xM_yN_z$;

wherein the magnetic layer has a structure which is of crystal grains of body-centered cubic;

each diameter of the crystal grains is less than 10 nm; and the crystal grains have lattice planes which are orientated at random.

According to a second feature of the invention, a magnetic head includes:

a magnetic core comprising a magnetic layer which is of a soft magnetic alloy mainly composed of Fe, N and M, "M" being at least one element selected from Ta, Zr, Nb, Hf and Ti, and the composition of the alloy meeting $72 \leq x \leq 82$, $5 \leq y \leq 15$, $10 \leq z \leq 15$ and $x+y+z=100$ by atomic percent, where the alloy is indicated to be $Fe_xM_yN_z$; and a substrate for supporting the magnetic core;

wherein the magnetic layer has a structure which is of crystal grains of body-centered cubic;

each diameter of the crystal grains is less than 10 nm; and the crystal grains have lattice planes which are orientated at random.

The other objects and features of the invention will become understood from the following description with reference to the accompanying drawings.

DESCRIPTION OF THE PREFERRED EMBODIMENTS

For better understanding of the background of the present invention, the basic principle is first described hereinafter with reference to FIGS. 1 to 7.

Figure 1:
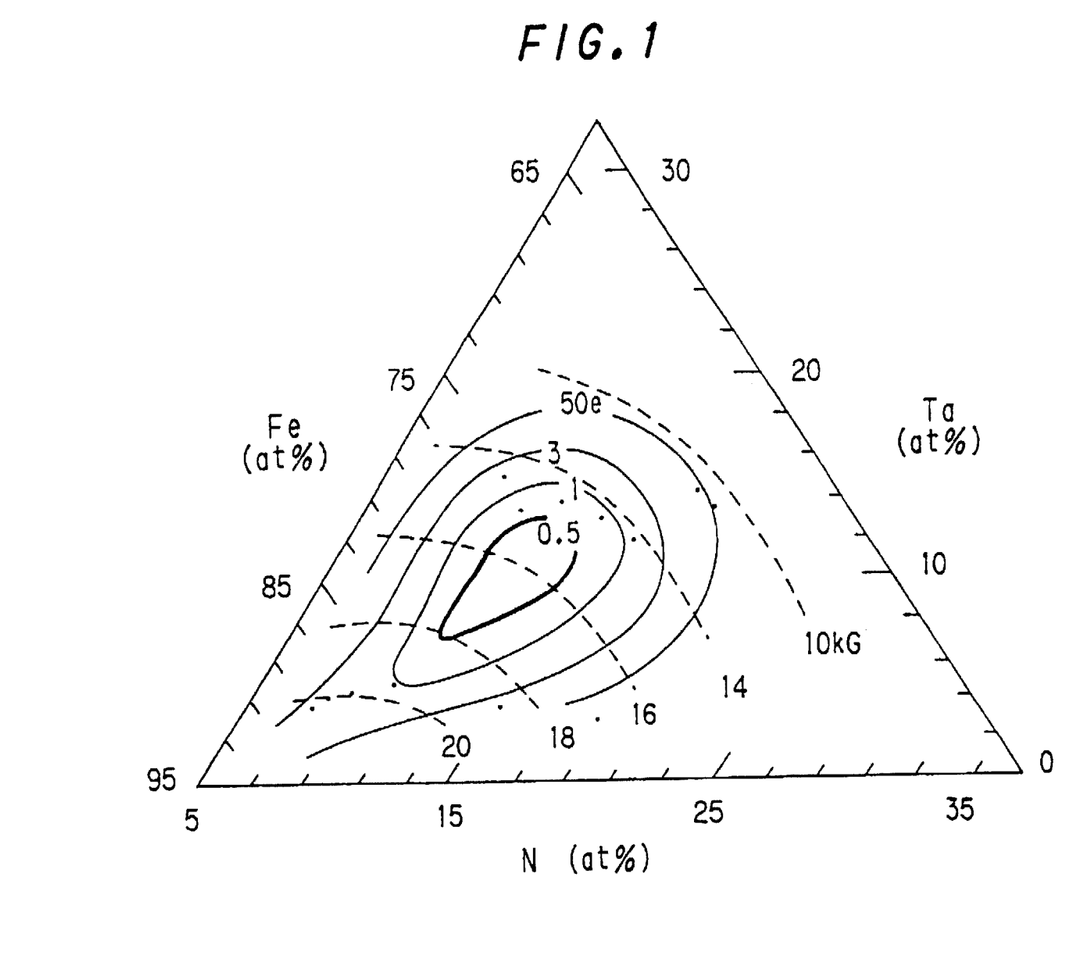
FIG. 1 is a graph showing coercivity and saturation magnetization of a FeTaN layer relative to the composition.

FIG. 1 shows a saturation magnetization of a FeTaN layer relative to the composition, wherein the FeTaN layer is formed by sputtering and is then annealed by 550 degrees Celsius for one hour. The FeTaN layer has a coercivity of 1 Oe (oersted) and a saturation magnetization of 14 to 18 kGs (gauss) when the FeTaN is composed of "Fe" of 72 to 82 atomic percent, "Ta" of 5 to 15 atomic percent and "N" of 10 to 15 atomic percent. These values of coercivity and saturation magnetization are preferable as soft magnetic material.

Figure 2:
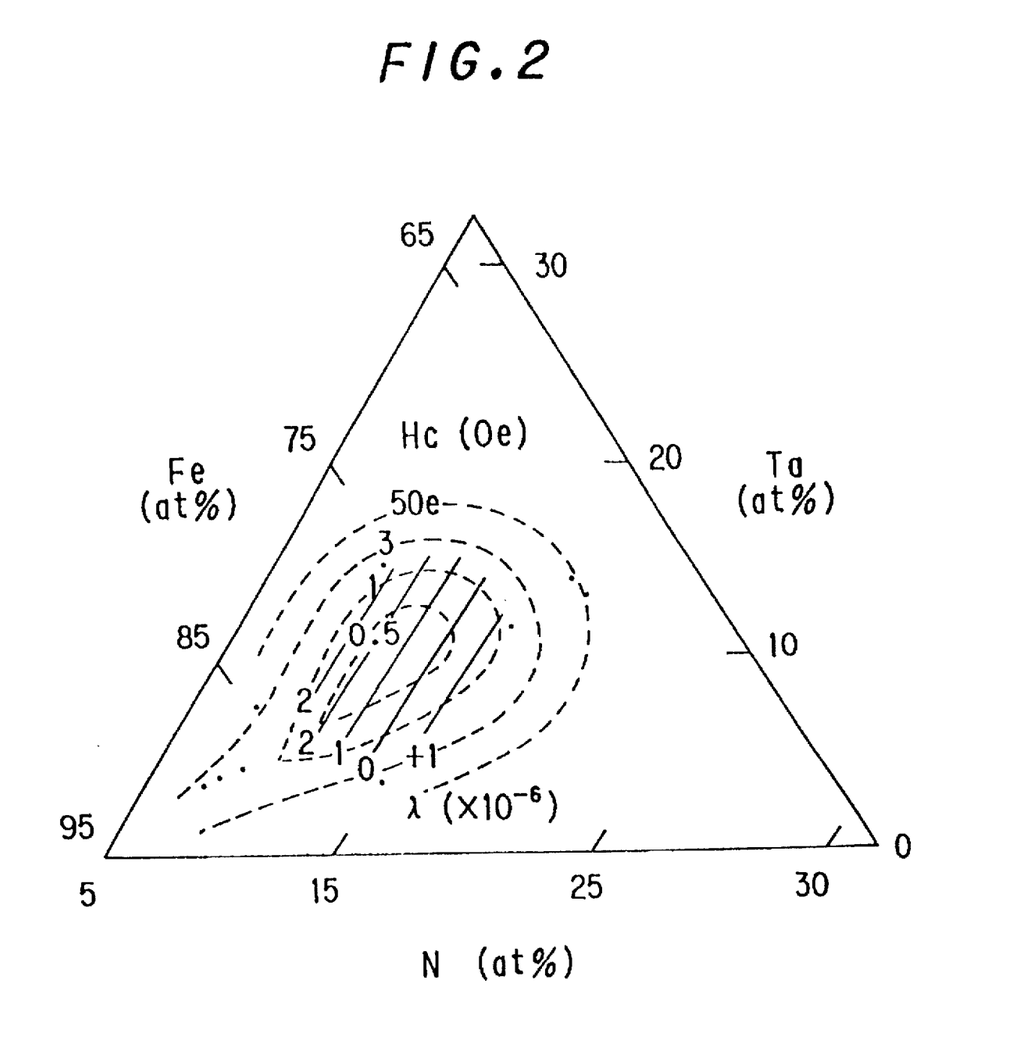
FIG. 2 is a graph showing magnetostriction of a FeTaN layer relative to the composition.

FIG. 2 shows magnetostriction of a FeTaN layer relative to the composition. According to the graph, it is found that magnetostriction varies in accordance with the composition of a FeTaN layer and the magnetostriction may become zero in a range in which the FeTaN layer has a composition which provides a small coercivity.

Figure 3:
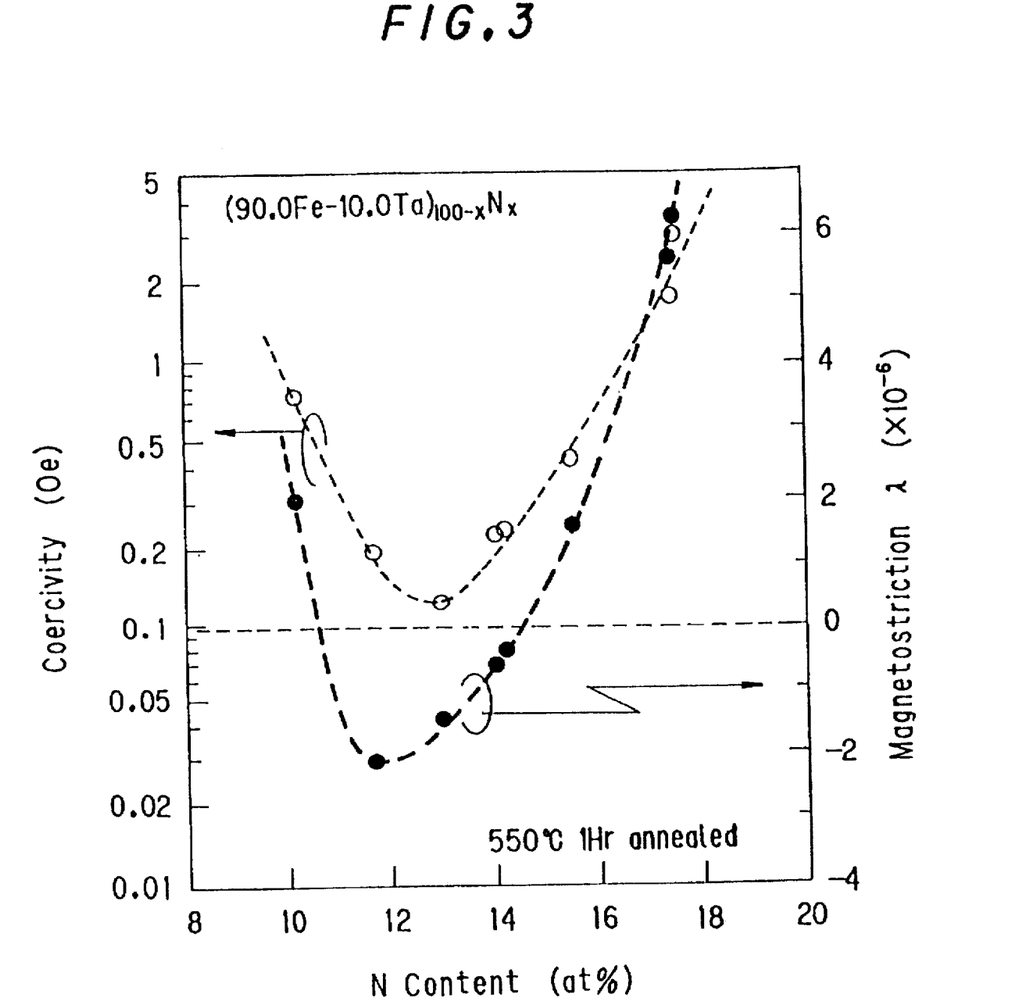
FIG. 3 is a graph showing coercivity and magnetostriction of a FeTaN layer relative to N-content.

FIG. 3 shows magnetostriction ($\lambda$) and coercivity (Hc) of a FeTaN layer relative to N-contact under condition that an atomic ratio between "Fe" and "Ta" is determined to be 9:1.

The FeTaN layer is formed to have a thickness of 3 μm on a water-cooled ceramic substrate of $CaTiO_3$—NiO system in an atmosphere of mixed gas of argon and nitrogen under a total pressure of 3 mTorr. This process is carried out by flat-plate type DC magnetron sputtering apparatus using FeTa alloy as a target. And then, the formed layer is annealed by 550 degrees Celsius for one hour.

In this case, nitrogen content is changed by adjusting partial pressure of nitrogen in a range of 0.16 mTorr to 0.3 mTorr during the forming process. At this time, the alloy target is composed of 88 atomic percent Fe and 12 atomic percent Ta. In this condition, the atomic ratio between Fe and Ta in the FeTaN layer is not changed when partial pressure of nitrogen is changed in the above mentioned range.

According to the graph of FIG. 3, it is found that coercivity Hc is less than 0.50 Oe and magnetostriction is −2 to +2×10$^{-6}$ when nitrogen content is 10 to 15 atomic percent. These values are preferable as material for a magnetic core to be mounted in a magnetic head.

Figure 4:
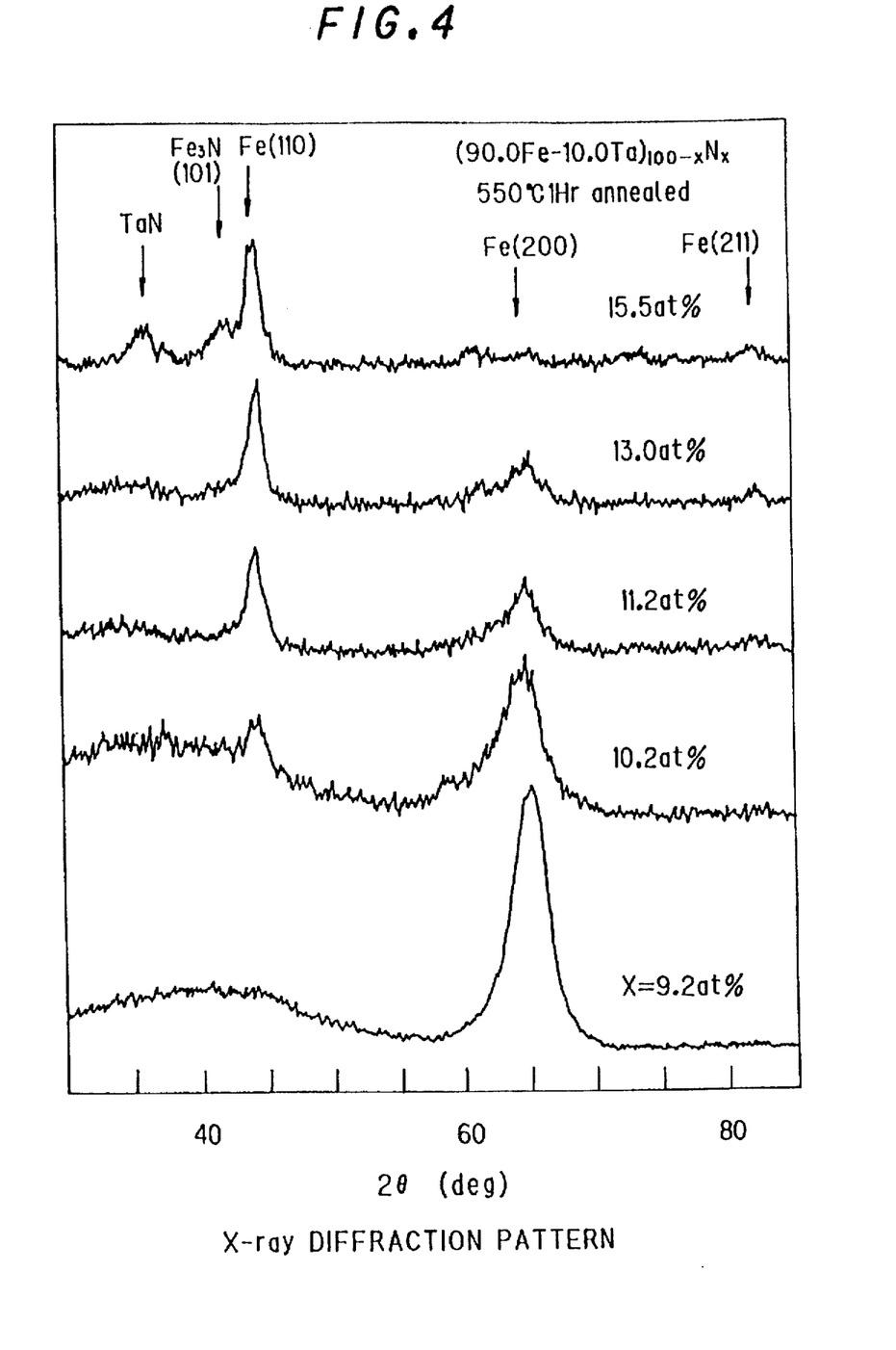
FIG. 4 is a graph showing X-ray diffraction pattern of a FeTaN layer.

FIG. 4 shows X-ray diffraction patterns of a FeTaN layer. In these patterns, α-Fe fine crystals have lattice planes which are arranged at random, that is, there is no orientation among the lattice planes, in case that the FeTaN layer has a composition causing the coercivity to be less than 0.50 Oe in FIG. 3. On the other hand, in case that the FeTaN layer has a composition causing the coercivity to be increased, a crystal structure different from the non-oriented structure of α-Fe fine crystals observed at the time of a low coercivity is obtained, s observed in the phenomen, for instance, that α-Fe fine crystals have (100) lattice plane which is preferentially orientated and diffraction occurs at a phase of iron nitride.

Figure 5:
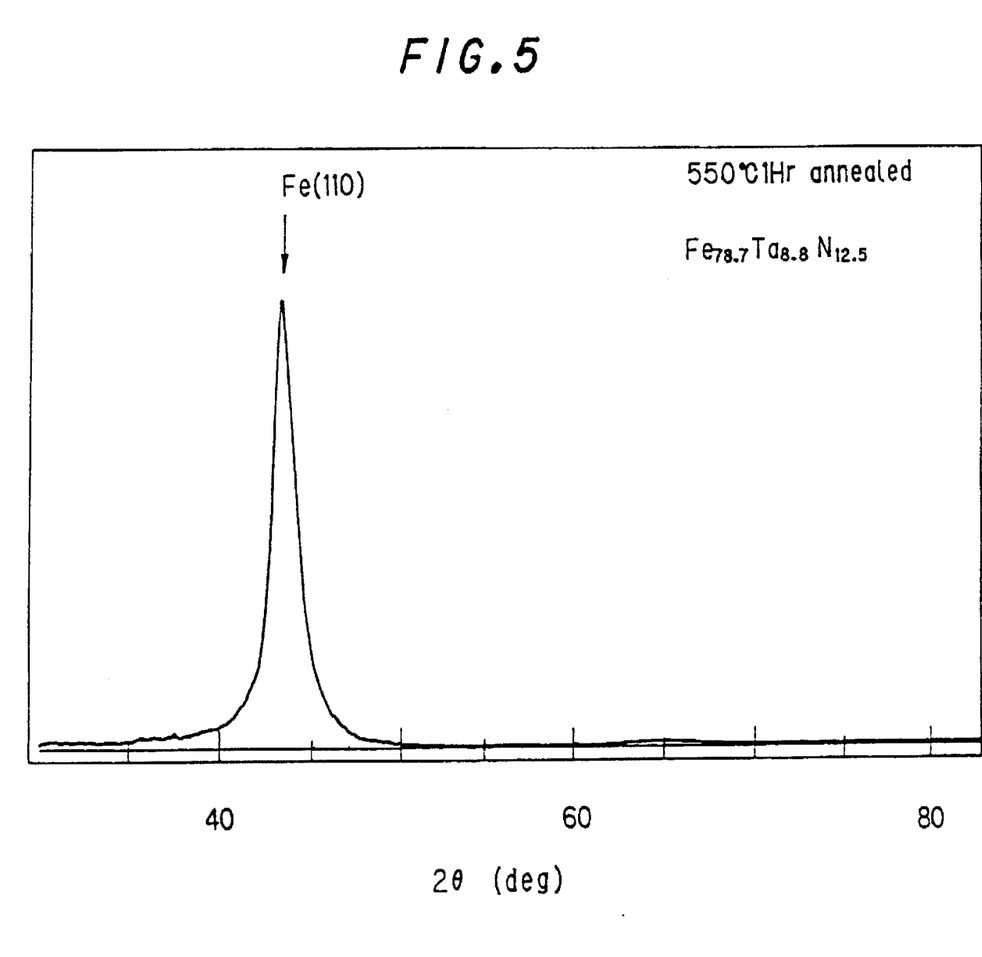
FIG. 5 is a graph showing X-ray diffraction pattern of a FeTaN layer.
Figure 6A:
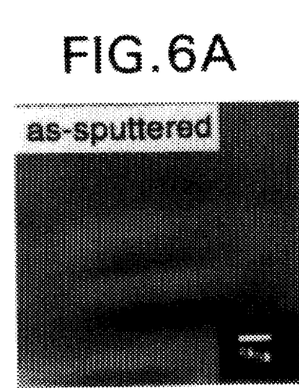
FIG. 6 is an electron beam diffraction figure by a transmission type electron microscope.
Figure 6B:
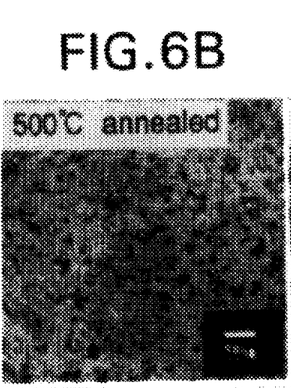
Figure 6C:
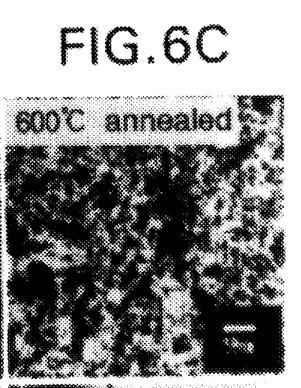
Figure 6D:
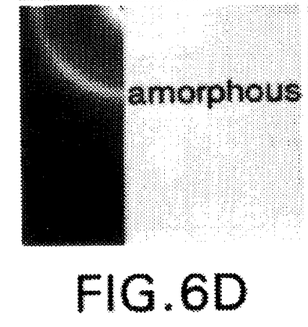
Figure 6E:
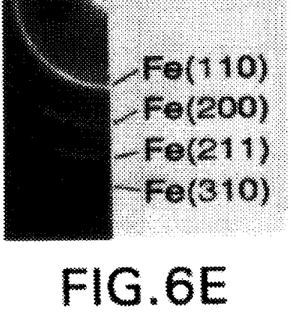
Figure 6F:
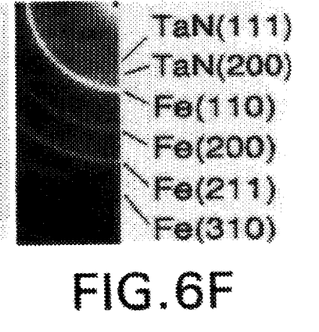

Even if the FeTaN layer has a composition causing the coercivity to be decreased in case of FIGS. 1 and 3, the FeTaN layer has a coercivity of more than 10 Oe in case that FeTaN layer has a structure in which α-Fe fine crystals have (110) lattice plane which is orientated as shown in FIG. 5. Such phenomenon tends to occur in case that the substrate on which the FeTaN layer is formed is not cooled sufficiently in a forming process of the FeTaN layer.

FIG. 6 shows three states immediately after sputtering film formation, 500 degrees Celsius annealing following the film formation, and 600 degrees Celsius annealing following the 500 degrees Celsius annealing, respectively, observed by a transmission type electronic microscope for the FeTaN film obtained by sputtering. The FeTaN film has amorphous structure at the state immediately after sputtering, so that the film has no property of soft magnetic material.

The FeTaN film has fine crystal texture of α-Fe after 500 degrees Celsius annealing, each of the fine crystals having a grain diameter of less than 10 nm. The 500 degrees Celsius annealed FeTaN film has a coercivity of less than 0.50 e. According to an electron beam diffraction image, the FeTaN layer has no orientation structure, that is, the lattice planes are orientated at random.

The FeTaN film after 600 degrees Celsius annealing includes fine crystals each having a grain diameter larger than that after 500 degrees Celsius annealing, and has a coercivity of more than 10 e.

Figure 7:
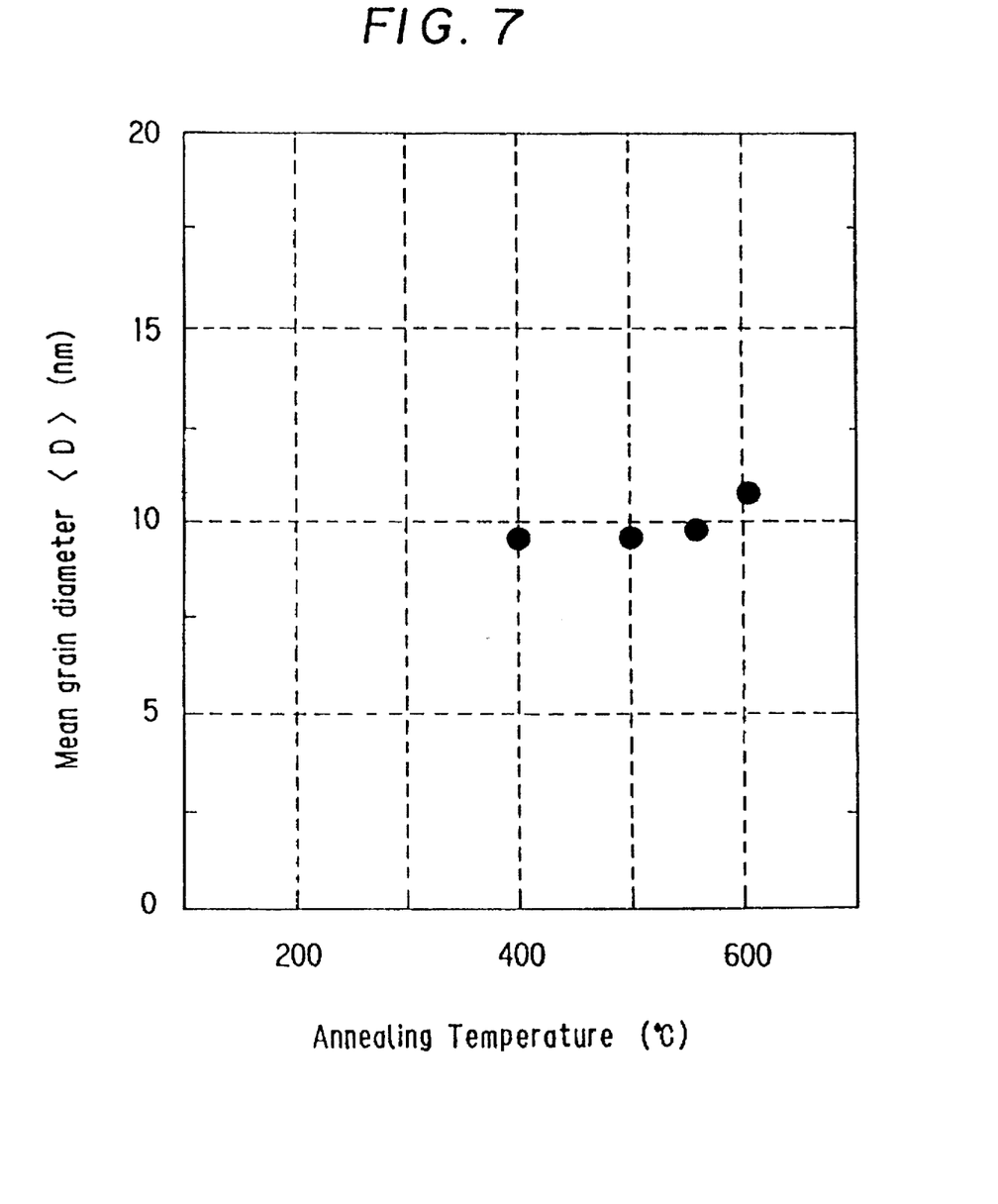
FIG. 7 is a graph showing mean grain diameters of a FeTaN layer relative to annealing temperatures.

FIG. 7 shows mean value of grain diameters of a FeTaN layer relative to annealing temperatures. According to the graph, it is found that a mean grain diameter becomes more than 10 nm when an annealing temperature is more than 600 degrees Celsius.

According to the above mentioned experimental data, a FeTaN having a predetermined composition has a preferable soft magnetic property under conditions that a mean diameter of crystal grains is less than 10 nm and the lattice planes of the crystal grains are orientated at random.

Figure 8:
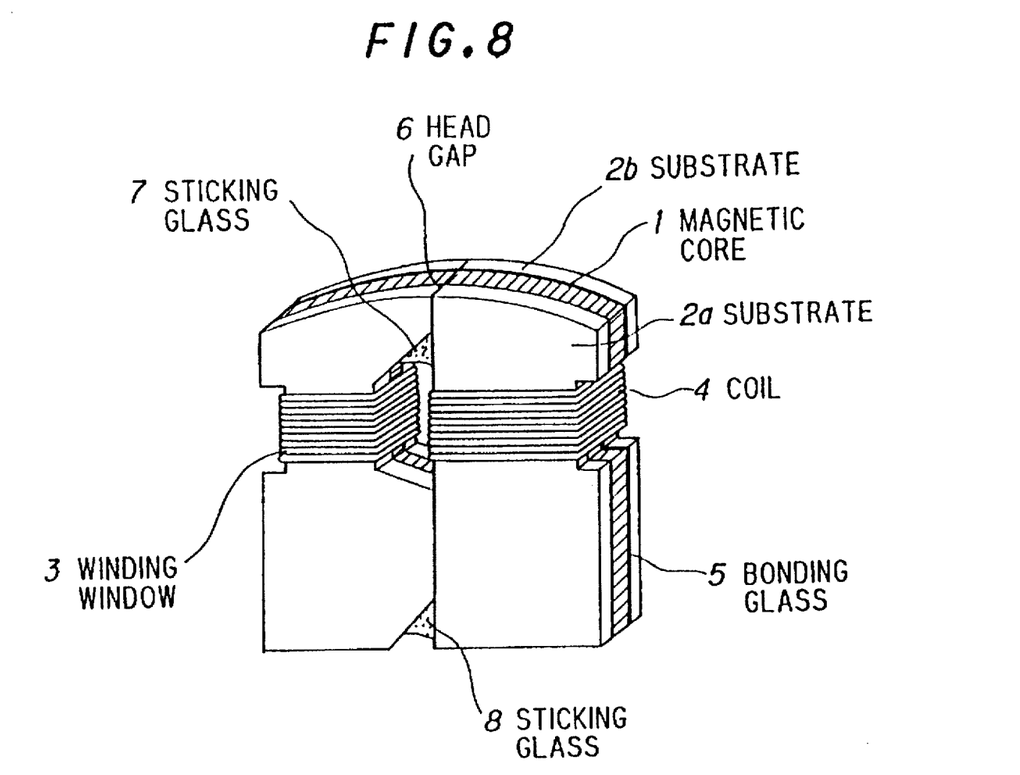
FIG. 8 is a perspective view showing a layered type magnetic head of a first preferred embodiment according to the invention.

FIG. 8 shows a layered type magnetic head of a first preferred embodiment according to the invention. The magnetic head includes a magnetic core 1 and two reinforcing substrates 2a and 2b for supporting the magnetic core 1 between them. The two halves of the magnetic head are stuck by sticking glass 8, wherein the magnetic core 1 and the substrate 2b is bonded by bonding glass 5. The magnetic head is provided with a winding window 3 through which a coil 4 is wound, and a head gap 6 having a length of 0.2 μm and a depth of 10 μm at the top thereof.

The magnetic core 1 includes a FeTaN layer which is composed of "Fe" of 72 to 82 atomic percent, "Ta" of 5 to 15 atomic percent and "N" of 10 to 15 atomic percent. The FeTaN layer has a coercivity of less than 0.5 Oe, a saturation magnetization of 15 to 16 kGs and an effective magnetic permeability of 1000 at 5 MHz.

In fabrication of the magnetic core 1, a FeTaN layer is formed to have a thickness of 3 μm on a water-cooled ceramic substrate of $CaTiO_3$—NiO system in an atmosphere of mixed gas of argon and nitrogen under a total pressure of 3 mTorr. This process is carried out by a flat-plate type DC magnetron sputtering apparatus using FeTa alloy as a target. And then, the formed layer is annealed by 550 degrees Celsius for one hour.

The magnetic core 1 is fabricated by laminating four FeTaN layers each having a thickness of 3 μm by interposing alumina intermediate layers each having a thickness of 0.1 μm between each two layers thereof on a substrate on which an alumina layer of 0.3 μm is formed. The alumina layer on the substrate is for avoiding diffusion of the FeTaN layer to the substrate.

Figure 9:
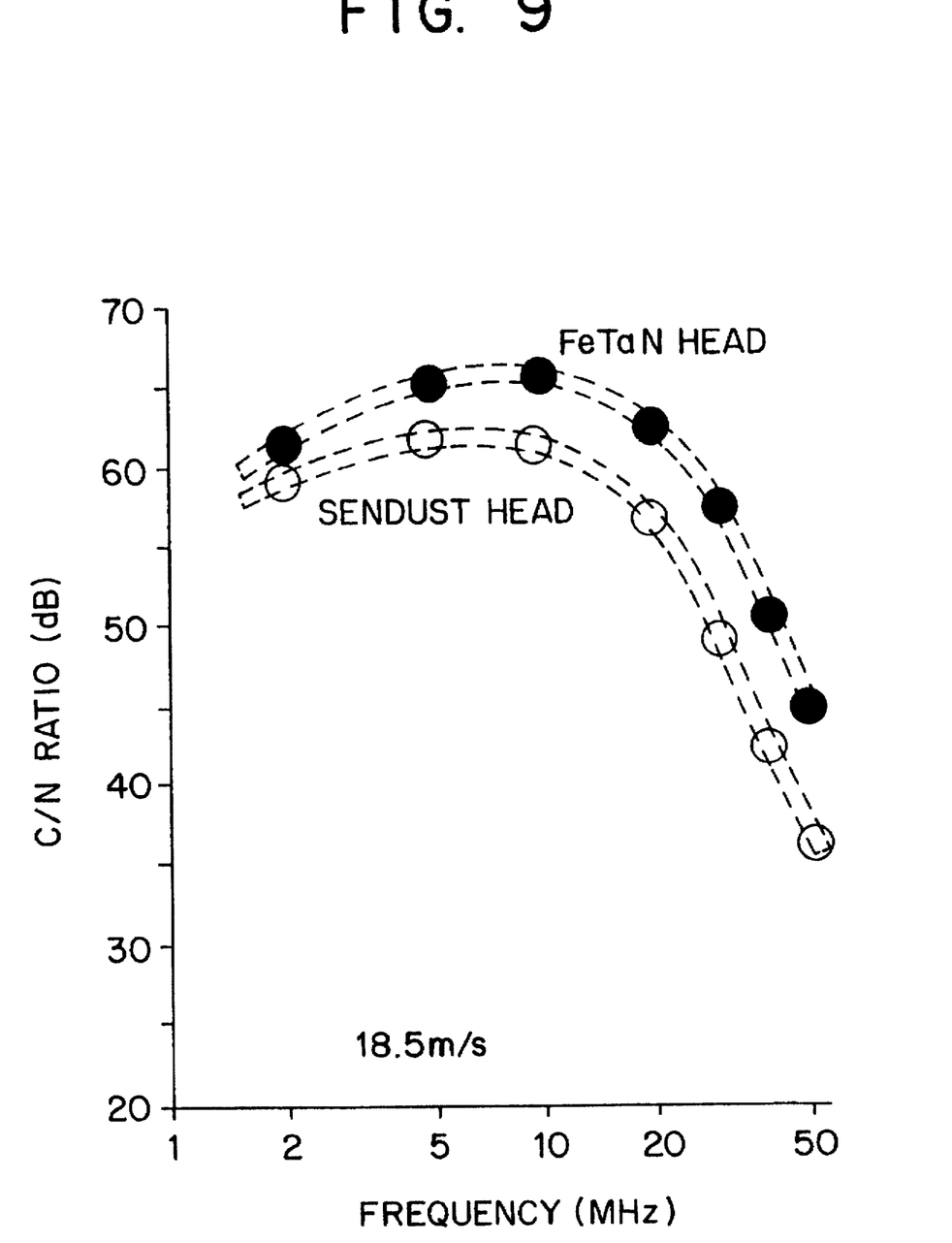
FIG. 9 is a graph showing C/N ration of the first preferred embodiment relative to frequency.

FIG. 9 shows C/N (carrier to noise) ratio relative to frequency. In this case, a metal magnetic tape having a coercive force of 1500 (Oe) is used, and a relative speed of head to tape is 18.5 m/s. According to the graph, it is found that the magnetic head of the first preferred embodiment supplies a high C/N (carrier to noise) ratio at a wide range of low frequency to high frequency, which can not be realized by the conventional magnetic head using a magnetic core of sendust.

Figure 10:
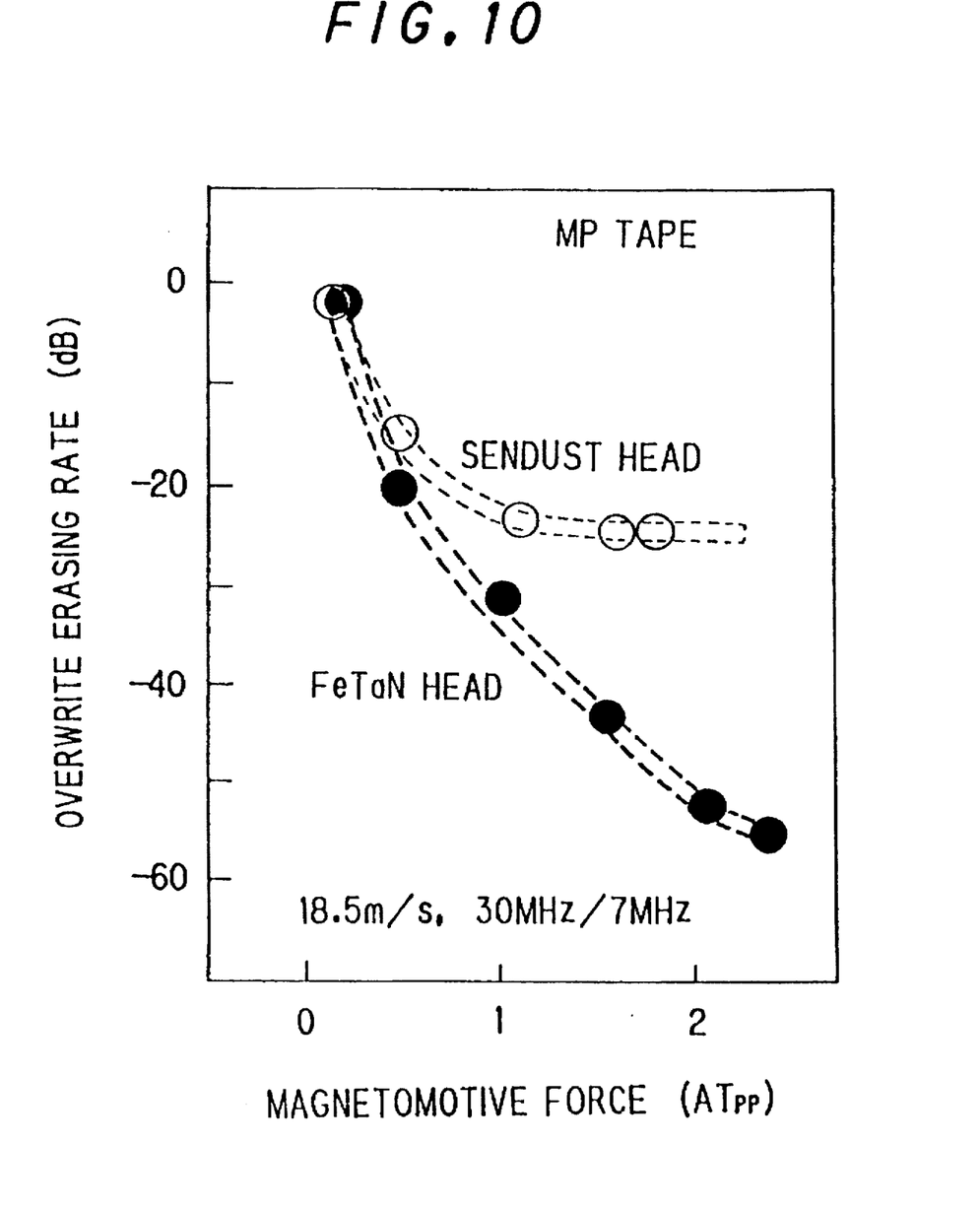
FIG. 10 is a graph showing overwrite erasing rate of the first preferred embodiment relative to maganetomotive force.

FIG. 10 shows overwrite erasing rate relative to magnetomotive force. In this case, data is recorded at 30 MHz directly on a magnetic tape on which data has been recorded at 7 MHz, and then, signal strength of 7 MHz is detected when the data is reproduced. The detected signal strength is overwrite erasing rate. According to the graph, it is found that the magnetic head of the first preferred embodiment has an overwrite erasing rate of about −60 dB at maximum which is nearly equal to noise level of an amplifier, while the conventional magnetic head of sendust has an overwrite erasing rate of about −20 dB at maximum. This result shows that the magnetic head of the first preferred embodiment has a considerably high recording capabilities.

Figure 11:
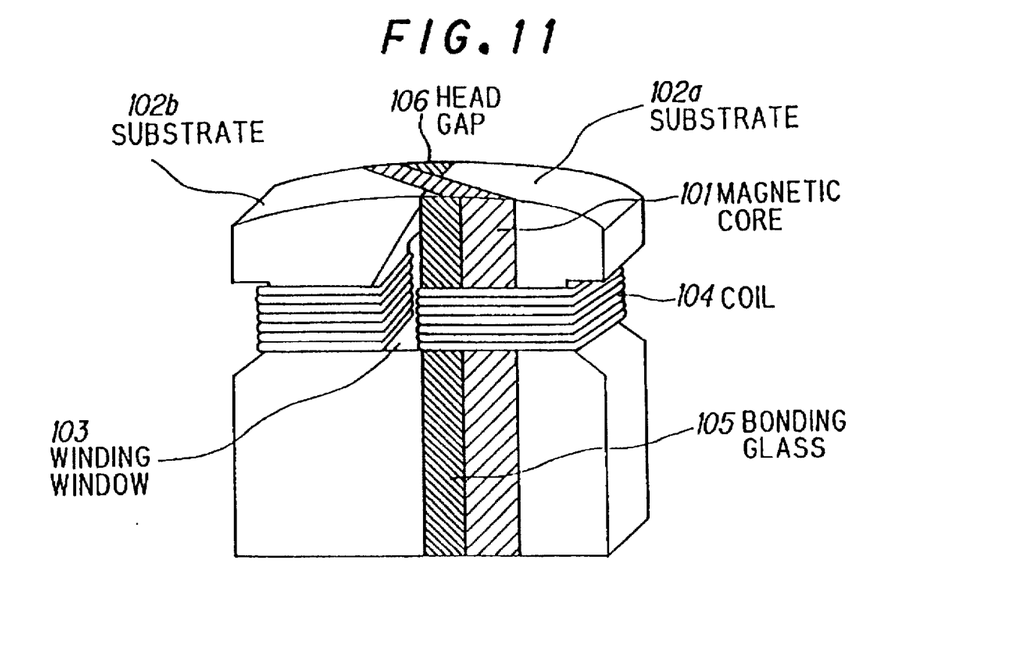
FIG. 11 is a perspective view showing a layered type magnetic head of a second preferred embodiment according to the invention.

FIG. 11 shows a magnetic head of a second preferred embodiment according to the invention, which includes a magnetic core 101 and two reinforcing substrates 102a and 102b. The magnetic core 101 includes a FeTaN layer having the same composition as that of the first preferred embodiment shown in FIG. 8. The magnetic core 101 and the substrates 102a and 102b are fixed each other by bonding glass 105. The magnetic head is provided with a winding window 103 through which a coil 104 is wound, and a head gap 106 at the top thereof.

According to the magnetic head of the second preferred embodiment, the same effect as the first preferred embodiment can be obtained.

Figure 12:
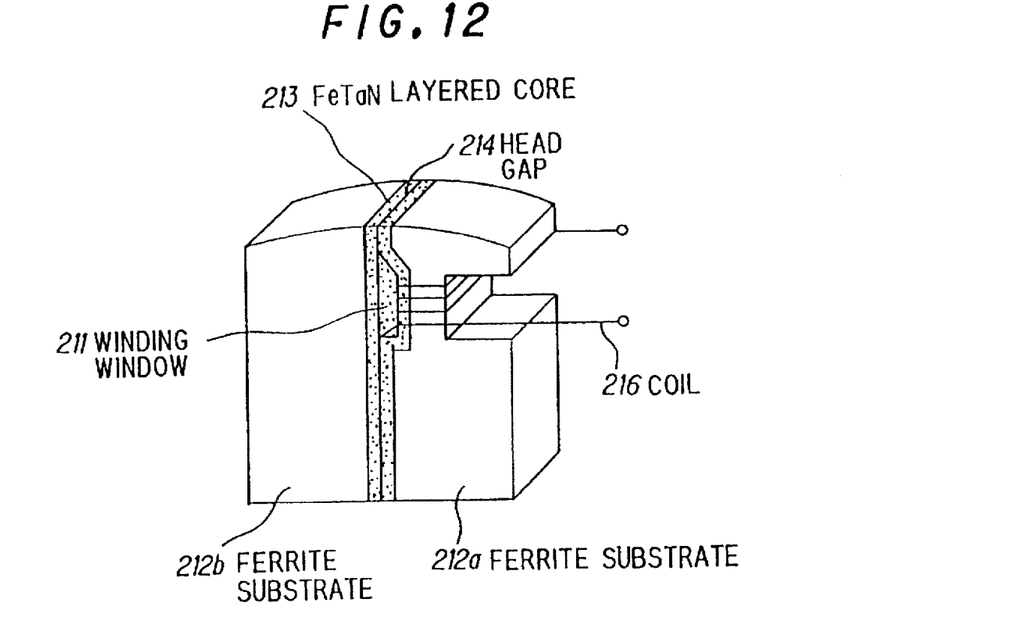
FIG. 12 is a perspective view showing a metal-in-gap head of a third preferred embodiment according to the invention.
Figure 13:
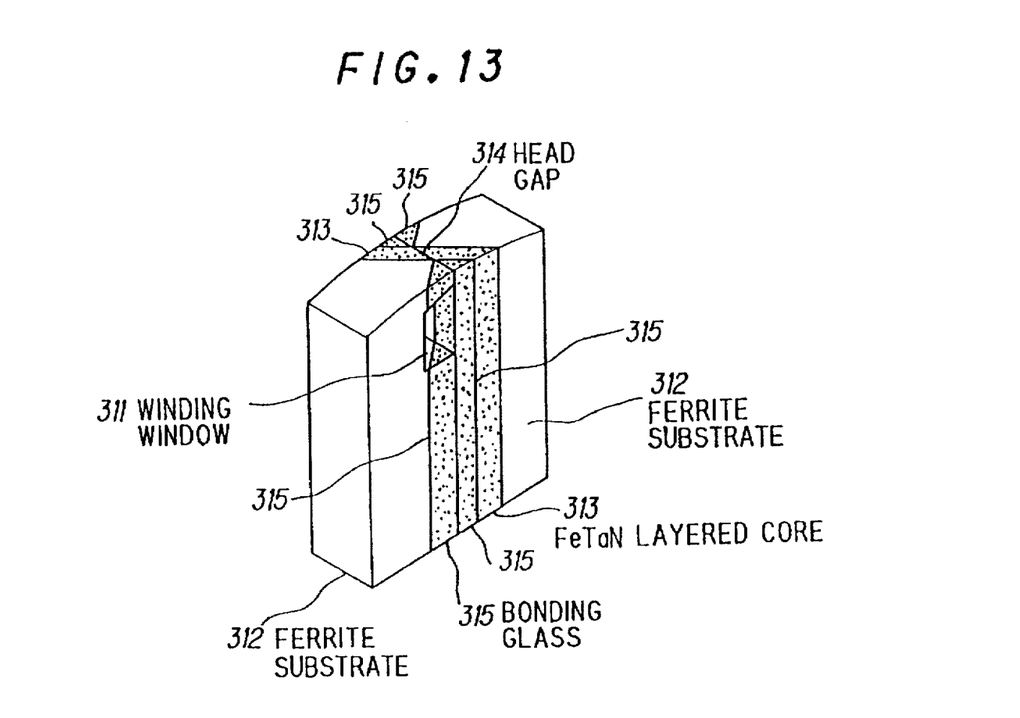
FIG. 13 is a perspective view showing a metal-in-gap head of a fourth preferred embodiment according to the invention.
Figure 14:
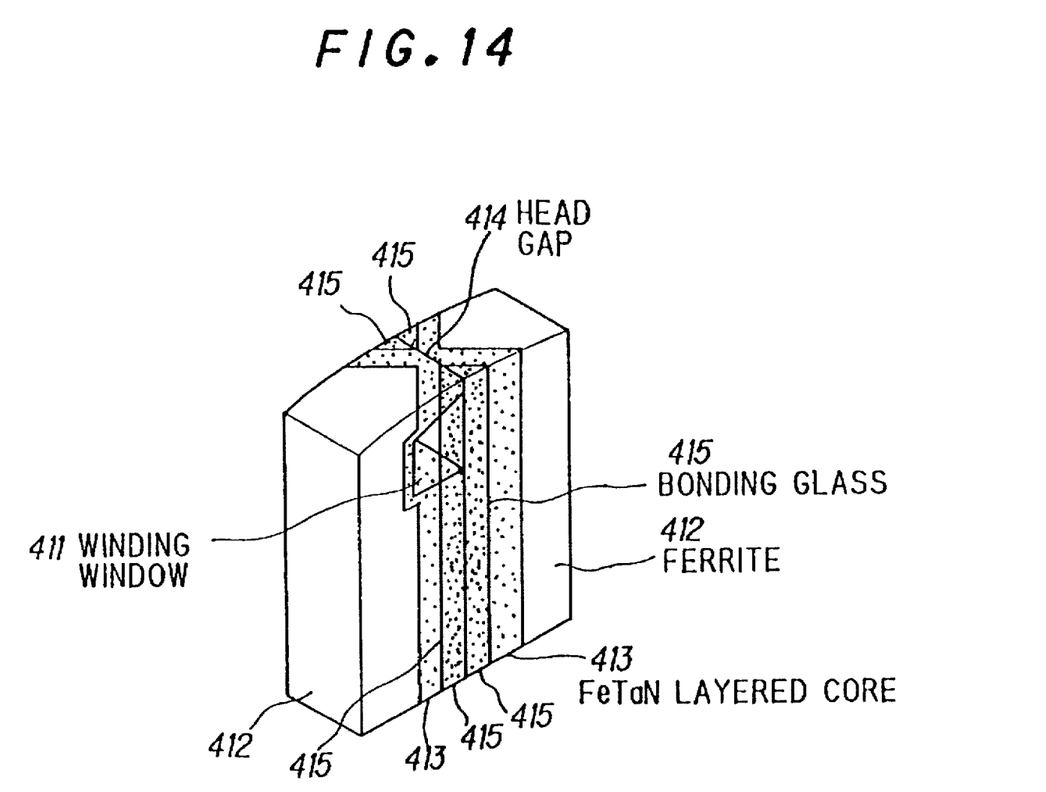
FIG. 14 is a perspective view showing a metal-in-gap head of a fifth preferred embodiment according to the invention.

FIGS. 12 to 14 show magnetic heads of third to fifth preferred embodiments according to the invention. The magnetic heads are of MIG head (metal in gap head).

The magnetic head of the third preferred embodiment shown in FIG. 12 includes a FeTaN layered core 213 and two ferrite substrates 212a and 212b. The FeTaN layered core 213 uses FeTaN layers each having the same composition as that of the first preferred embodiment shown in FIG. 8. The magnetic head is provided with a winding window 211 through which a coil 216 is wound, and a head gap 214 at the top thereof.

The magnetic head of the fourth preferred embodiment shown in FIG. 13 includes a FeTaN layered core 313 and two ferrite substrates 312a and 312b. The FeTaN layered core 313 uses FeTaN layers having the same composition as that of the first preferred embodiment shown in FIG. 8. The FeTaN layered core 313 and the ferrite substrates 312a and 312b are fixed each other by bonding glass 315. The magnetic head is provided with a winding window 311 through which a coil (not shown) is wound, and a head gap 314 at the top thereof.

The magnetic head of the fifth preferred embodiment shown in FIG. 14 includes a FeTaN layered core 413 and two ferrite substrates 412a and 412b. The FeTaN layered core 413 uses FeTaN layers each having the same composition as that of the first preferred embodiment shown in FIG. 8. The FeTaN layered core 413 and the ferrite substrates 412a and 412b are fixed each other by bonding glass 415. The magnetic head is provided with a winding window 411 through which a coil (not shown) is wound, and a head gap 414 at the top thereof.

Each of the head gaps 214, 314 and 414 has a length of 0.2 µm and a depth of 10 µm.

According to the magnetic heads of the third to fifth preferred embodiments, the same effect as the first preferred embodiment can be obtained.

Figure 15A:
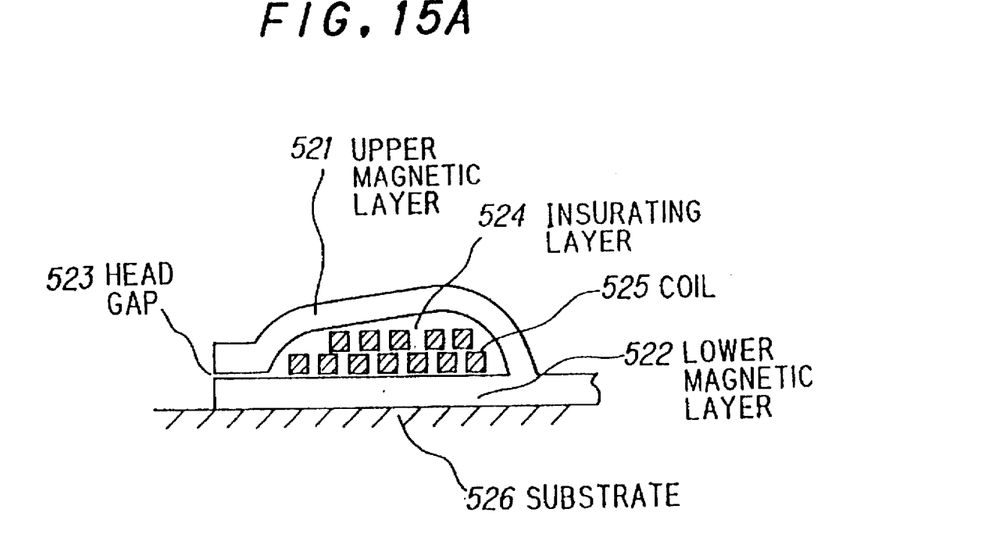
FIG. 15A is a cross sectional view showing a thin film type magnetic head of a sixth preferred embodiment according to the invention.
Figure 15B:
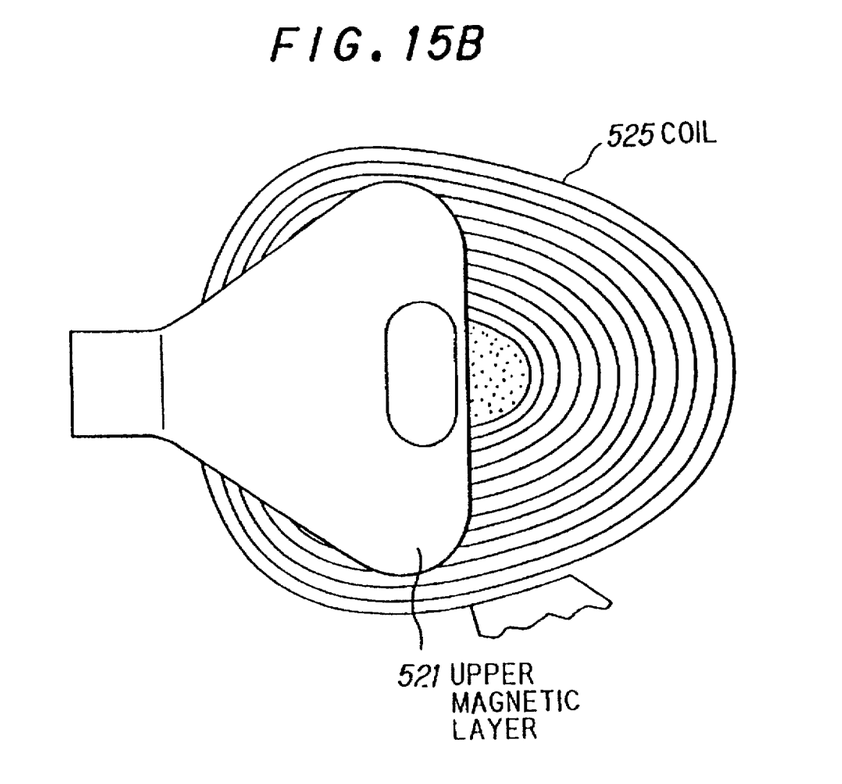
FIG. 15B is a top view of the thin film type magnetic head shown in FIG. 15A.

FIGS. 15A and 15B show a magnetic head of a thin film type of a sixth preferred embodiment according to the invention. The magnetic head includes a substrate 526, a lower magnetic layer 522, an insulating layer 524, a coil 525 and an upper magnetic layer 521. The coil 525 is insulated by the insulating layer 24. A head gap 523 is formed between the lower and upper magnetic layers 522 and 521 to have a length of 0.3 µm and a depth of 3 µm. Each of the lower and upper magnetic layers 522 and 521 is of FeTaN having the same composition as that of the first preferred embodiment shown in FIG. 8.

According to the magnetic head of the sixth preferred embodiment, the same effect as the first preferred embodiment can be obtained.

In the present invention, any one element selected from Zr, Nb, Hf and Ti may be used for a magnetic core instead of Ta.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching herein set forth.

What is claimed is:

1. A magnetic head comprising:

a magnetic core comprising a magnetic layer which is of a soft magnetic alloy mainly composed of Fe, N and M, said M being at least one element selected from the group consisting of Ta, Zr, Nb, Hf and Ti, and said composition of said alloy meeting $72 \leq x \leq 82$, $5 \leq y \leq 15$, $10.6 \leq z \leq 15$, and $x+y+z=100$ by atomic weight per cent, wherein said alloy is indicated to be $Fe_xM_yN_z$; and a substrate for supporting said magnetic core;

wherein said magnetic layer has a structure which is of crystal grains of body-centered cubic;

wherein said crystal grains have lattice planes which are oriented at random;

and wherein said magnetic film achieves a coercivity of less than 0.20 Oe.

2. A magnetic core comprising a magnetic layer which is of a soft magnetic alloy mainly composed of Fe, N, and M, said M being at least one element selected from the group consisting of Ta, Zr, Nb, Hf, and Ti, the alloy meeting $72 \leq x \leq 82$, $5 \leq y \leq 15$, $10.6 \leq z \leq = 15$, and $x+y+z=100$ by atomic weight per cent, wherein said alloy is indicated to be $Fe_xM_yN_z$;

wherein said magnetic layer is formed on a substrate by sputtering and then is annealed in a temperature less than 600° C.;

wherein said magnetic layer has a structure which is of crystal grains of body-centered cubic;

wherein said crystal grains have lattice planes in which X-ray diffraction intensity ratio of (200) peak to (110) peak is less than ⅓;

and wherein said magnetic film achieves a coercivity of less than 0.20 Oe.

3. A magnetic head comprising a magnetic core comprising a magnetic layer which is of a soft magnetic alloy mainly composed of Fe, N, and M, said M being at least one element selected from the group consisting of Ta, Zr, Nb, Hf, and Ti, and said alloy meeting $72 \leq x \leq 82$, $5 \leq y \leq 15$, $10.6 \leq z \leq 15$ and $x+y+z=100$ by atomic weight per cent, wherein said alloy is indicated to be $Fe_xM_yN_z$, and a substrate for supporting said magnetic core;

wherein said magnetic layer is formed on a substrate by sputtering and then is annealed in a temperature less then 600° C.;

wherein said magnetic layer has a structure which is of crystal grains of body-centered cubic;

wherein said crystal grains have lattice planes in which X-ray diffraction intensity ratio of (200) peak to (110) peak is less than ⅓;

and wherein said magnetic film achieves a coercivity value of less than 0.20 Oe.

4. A magnetic core, according to claim 2, wherein:

said magnetic core is a MIG (metal in gap) head.

5. A magnetic core, according to claim 2, wherein:

said magnetic layer is a thin film.

* * * * *